US008240233B2

(12) United States Patent
Huang

(10) Patent No.: US 8,240,233 B2
(45) Date of Patent: Aug. 14, 2012

(54) CONNECTING ROD OF A TOOL HEAD

(76) Inventor: Jui-Min Huang, Taichung (TW)

( * ) Notice: Subject to any disclaimer, the term of this patent is extended or adjusted under 35 U.S.C. 154(b) by 339 days.

(21) Appl. No.: 12/759,210

(22) Filed: Apr. 13, 2010

(65) Prior Publication Data

US 2010/0282034 A1 Nov. 11, 2010

(30) Foreign Application Priority Data

May 11, 2009 (TW) ............................... 98208038 U

(51) Int. Cl.
*B25B 13/44* (2006.01)
*B23B 31/107* (2006.01)
*B25G 3/18* (2006.01)
*B25B 15/00* (2006.01)

(52) U.S. Cl. ............................................ 81/438; 279/22

(58) Field of Classification Search .................... 81/438, 81/439, 177.4, 177.85; 279/22, 29, 30, 76, 279/905

See application file for complete search history.

(56) References Cited

U.S. PATENT DOCUMENTS

| | | | | | |
|---|---|---|---|---|---|
| 2,190,081 | A * | 2/1940 | Pfauser | 403/328 |
| 5,481,949 | A * | 1/1996 | Yen | 81/438 |
| 5,685,208 | A * | 11/1997 | Tidwell | 81/177.85 |
| 6,405,396 | B1 * | 6/2002 | Tsai | 7/165 |
| 6,561,523 | B1 * | 5/2003 | Wienhold | 279/30 |
| 6,637,755 | B2 * | 10/2003 | Chen et al. | 279/22 |
| 7,581,470 | B1 * | 9/2009 | Huang | 81/438 |
| 7,891,275 | B2 * | 2/2011 | Huang | 81/438 |
| 2008/0072718 | A1 * | 3/2008 | Liu | 81/438 |

* cited by examiner

*Primary Examiner* — David B Thomas
(74) *Attorney, Agent, or Firm* — Egbert Law Offices PLLC

(57) ABSTRACT

An improved connecting rod of a tool head includes a hollow rod having an assembly end and a tool head inserting end. The tool head inserting end is recessed axially to form a slot, and a radial through-hole is placed therethrough. An internal slider is assembled into the slot in an axial sliding and non-rotating state. The internal slider has a tool head abutting end and a radial groove. A magnetic member is assembled onto the tool head abutting end. An elastic bracing member is assembled between the internal slider and the inner wall of the slot, and elastically supports the internal slider. A control bead is assembled into the radial groove of the internal slider, and shifting elastically with assembly of an elastic member. One side of the control bead is aligned with the radial through-hole of the slot, so it can be protruded in a positioning state.

9 Claims, 8 Drawing Sheets

CONNECTING ROD OF A TOOL HEAD

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention relates generally to a handheld tool, and more particularly to an innovative one which is configured with a connecting rod for the tool head.

2. Description of Related Art Including Information Disclosed Under 37 CFR 1.97 and 37 CFR 1.98

The common electric screwdrivers with adjustable assembly heads permit assembly or replacement of screwdriver heads or drill heads of different sizes. However, owing to larger external diameter, said assembly head cannot be inserted into a small gap wherein the screws are located. Hence, a connecting rod of a tool head has been developed for this purpose. As for said connecting rod of tool head, one end is generally provided with an assembly rod adapted onto the assembly head of the electric screwdriver, and the other end is extended to a preset length and provided with a tool head slot for the screwdriver heads or drill heads.

Said connecting rod of tool head is structurally configured in such a manner that an elastic release mechanism is generally set to make the screwdriver head generate a springing action for easily taking out the tool head. According to the conventional configuration of said elastic release mechanism, a control loop is arranged onto the periphery of the inserting end of the screwdriver head for the tool head connecting rod. By pushing the control loop, the locating member preset in the connecting rod of the screwdriver head can be controlled into a release state, so that the inserted tool head can spring out to a certain distance, allowing for easily taking out by the user. Yet, it is observed from actual applications that, as the control loop is arranged onto the periphery of the inserting end of the tool head connecting rod, the external diameter of the tool head connecting rod is expanded, so it cannot be inserted into small gap without expected functions and advantages.

Moreover, said control loop is operated manually by gripping and pushing with at least two fingers (generally thumb and forefinger), this makes it inconvenient and difficult to hold manually and apply a force to it.

Thus, to overcome the aforementioned problems of the prior art, it would be an advancement if the art to provide an improved structure that can significantly improve the efficacy.

Therefore, the inventor has provided the present invention of practicability after deliberate experimentation and evaluation based on years of experience in the production and development of related products.

BRIEF SUMMARY OF THE INVENTION

The enhanced efficacy of the present invention is as follows:

First, based on the unique configuration of the present invention wherein the positioning and releasing state of the internal slider of the tool head connecting rod is realized by said control bead, and the control bead is protruded into the space of said lateral recess, the present invention allows for elimination of the exposed control loop of prior art. The tool head connecting rod of much lower diameter can be inserted into small gap, thus improving the efficacy and flexibility.

Second, the control bead can be operated in a way to release easily the internal slider by means of single finger pressing. Said control bead can be positioned in a way to pass through the radial through-hole by insertion and pushing of the tool head, so the positioning and releasing state of the internal slider and tool head can be switched more easily and conveniently with better applicability.

Third, the tool head connecting rod of the present invention only comprises a hollow rod, internal slider, magnetic member, elastic bracing member and control bead, so the components of simple construction can be easily manufactured in batch mode, thus reducing the manufacturing cost and improving the economic benefits.

The improvements brought about by this invention are as follow:

Based on the structural configuration wherein when the control bead is aligned with the radial through-hole of the slot in a positioning state, the centerline surpasses the end surface of the radial groove, so the embedded positioning state of the control bead becomes more stable, eliminating efficiently the positioning tolerance. Meanwhile, the recessed positioning state of the internal slider is made more accurate and stable without loosening and jittering.

DETAILED DESCRIPTION OF THE INVENTION

Figure 1:
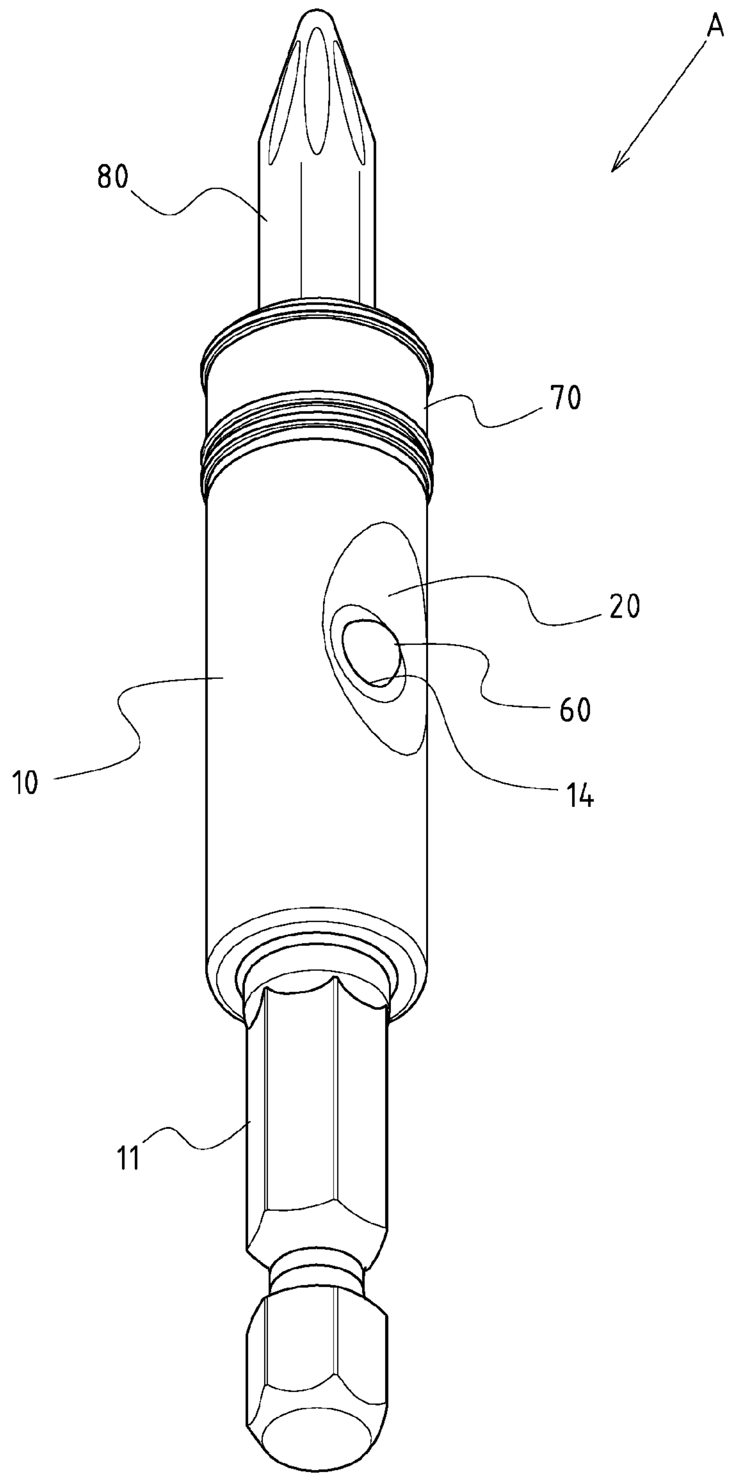
FIG. 1 shows a perspective view of the assembled present invention.
Figure 2:
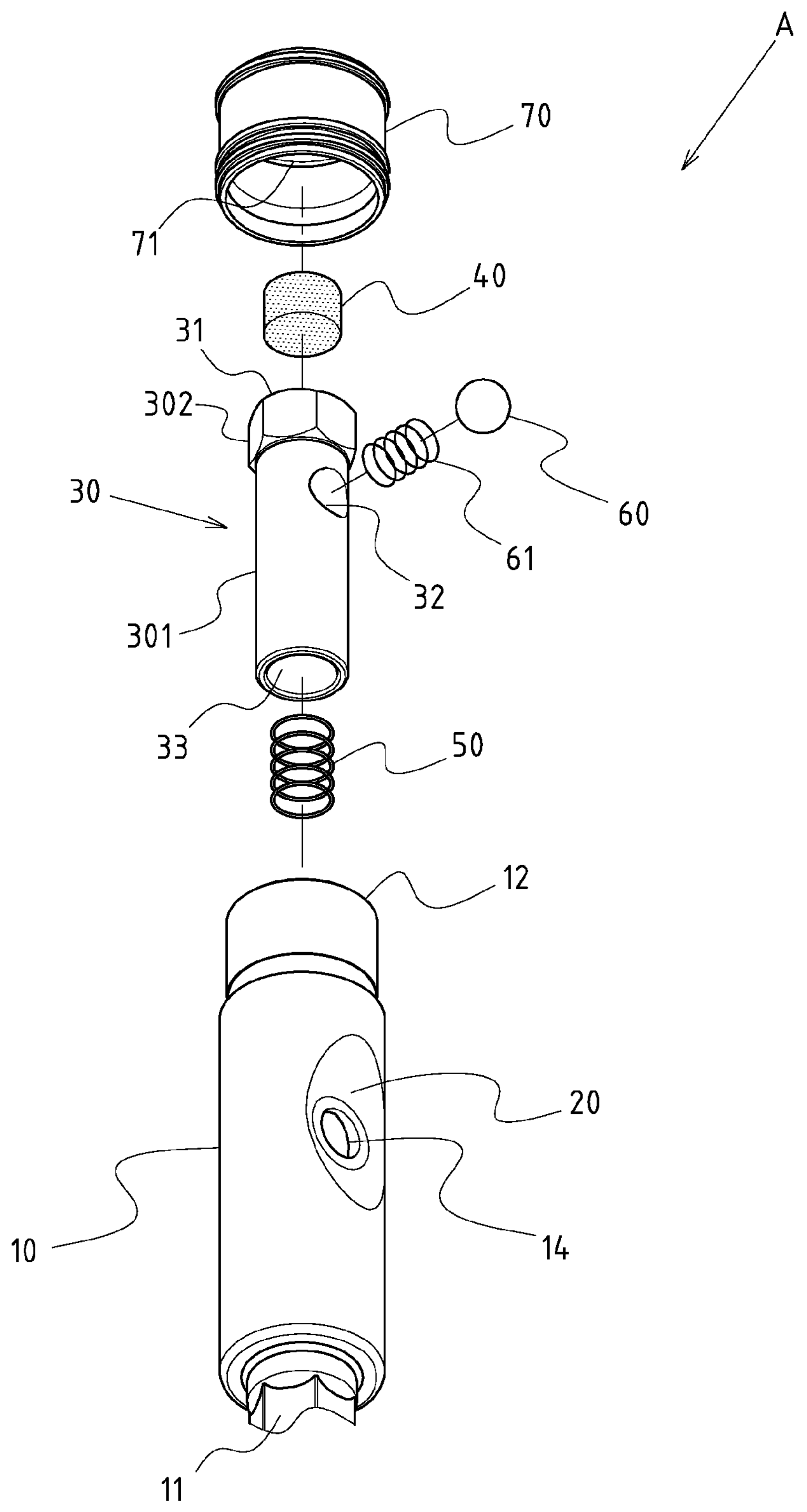
FIG. 2 shows an exploded perspective view of the present invention.
Figure 3:
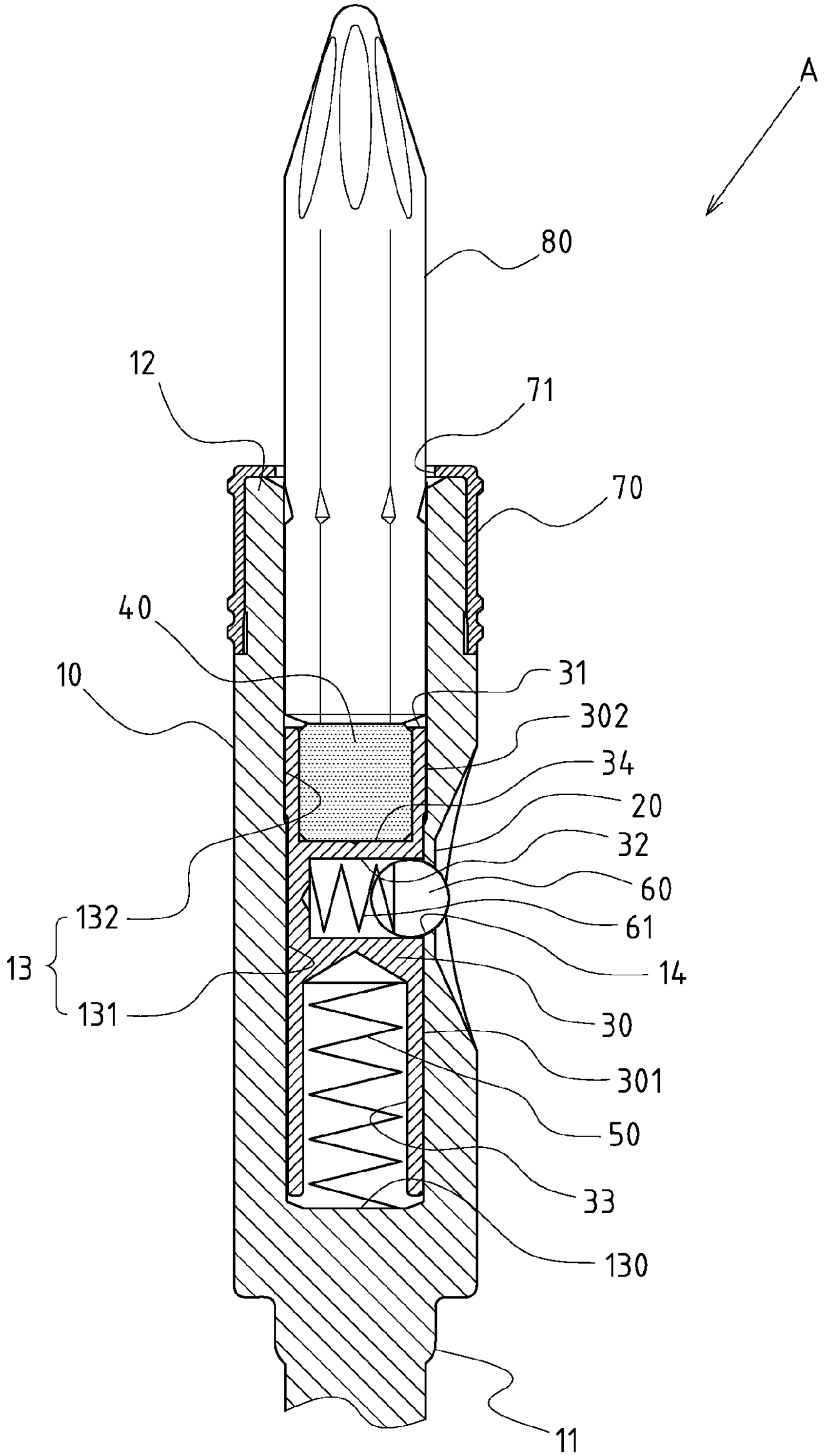
FIG. 3 shows a sectional view of the assembled present invention showing the recessed positioning state of the internal slider.

FIGS. 1-3 depict preferred embodiments of a tool head connecting rod of the present invention, which are provided for only explanatory objective for patent claims. Said tool head connecting rod A includes a hollow rod 10, comprising an assembly end 11 and a tool head inserting end 12. The tool head inserting end 12 is recessed axially to form a slot 13, and a radial through-hole 14 is placed at a preset depth into the slot 13.

A lateral recess 20 is recessed externally onto one side of the hollow rod 10, and the radial through-hole 14 is aligned with the center of the lateral recess 20.

An internal slider 30 is assembled into the slot 13 of the hollow rod 10 in an axial sliding and non-rotating state. The internal slider 30 is provided with a tool head abutting end 31 and a radial groove 32.

A magnetic member 40 is assembled onto the tool head abutting end 31 of the internal slider 30.

An elastic bracing member 50, made of a spiral spring, is assembled between the inner end of the internal slider 30 and the inner wall 130 of the slot 13, and used to support elastically the internal slider 30. A groove 33 is set at inner end of the internal slider 30 for embedding of the elastic bracing member 50.

A control bead 60, made of a steel ball, is assembled into the radial groove 32 of the internal slider 30. The control bead 60 is elastic with assembly of an elastic member 61 (e.g.: a spiral spring). Moreover, the exterior of the control bead 60 is aligned with the radial through-hole 14 of the slot 13, so it can be protruded elastically into the space of the lateral recess 20 in a positioning state, or retracted under external force.

Furthermore, an end cover 70 is assembled onto the exterior of the tool head inserting end 12 of the hollow rod 10. The end cover 70 is also provided with a reducing port 71. The end cover 70 is arranged for the purpose of decoration, labeling and skidproofing.

The slot 13 of the hollow rod 10 includes around internal slotted section 131 and a hexagonal external slotted section 132. A cylindrical section 301 and a hexagonal columnar section 302 are arranged externally onto the internal slider 30, so that the sliding of the internal slider 30 can be positioned without rotation through polygonal mating of the hexagonal columnar section 302 and the hexagonal external slotted section 132.

A groove 34 is set centrally onto the tool head abutting end 31 of the internal slider 30, so that the magnetic member 40 is embedded into the groove 34 for stable positioning.

Based on the above-specified structural configuration, the present invention is operated as follows:

Referring to FIG. 3, a single-headed tool head 80 is inserted into the tool head connecting rod A. When the tool head 80 is inserted into the slot 13 of the tool head connecting rod A and abutted onto the tool head abutting surface 31 of the internal slider 30, the tool head 80 will be adsorbed by the magnetic member 40 on the tool head abutting surface 31 for the positioning effect. On the other hand, the inward pushing of internal slider 30 will press the elastic bracing member 40 to accumulate elastic force. When the internal slider 30 is shifted to a preset depth, the control bead 60 is aligned with the radial through-hole 14 of the slot 13. In such a case, the control bead 60 is pushed out of the radial through-hole 14 and protruded into the space of lateral recess 20 with the elastic force of the elastic member 61, meanwhile the retraction state of the internal slider 30 can be retained securely through the protruding of the control bead 60.

Figure 4:
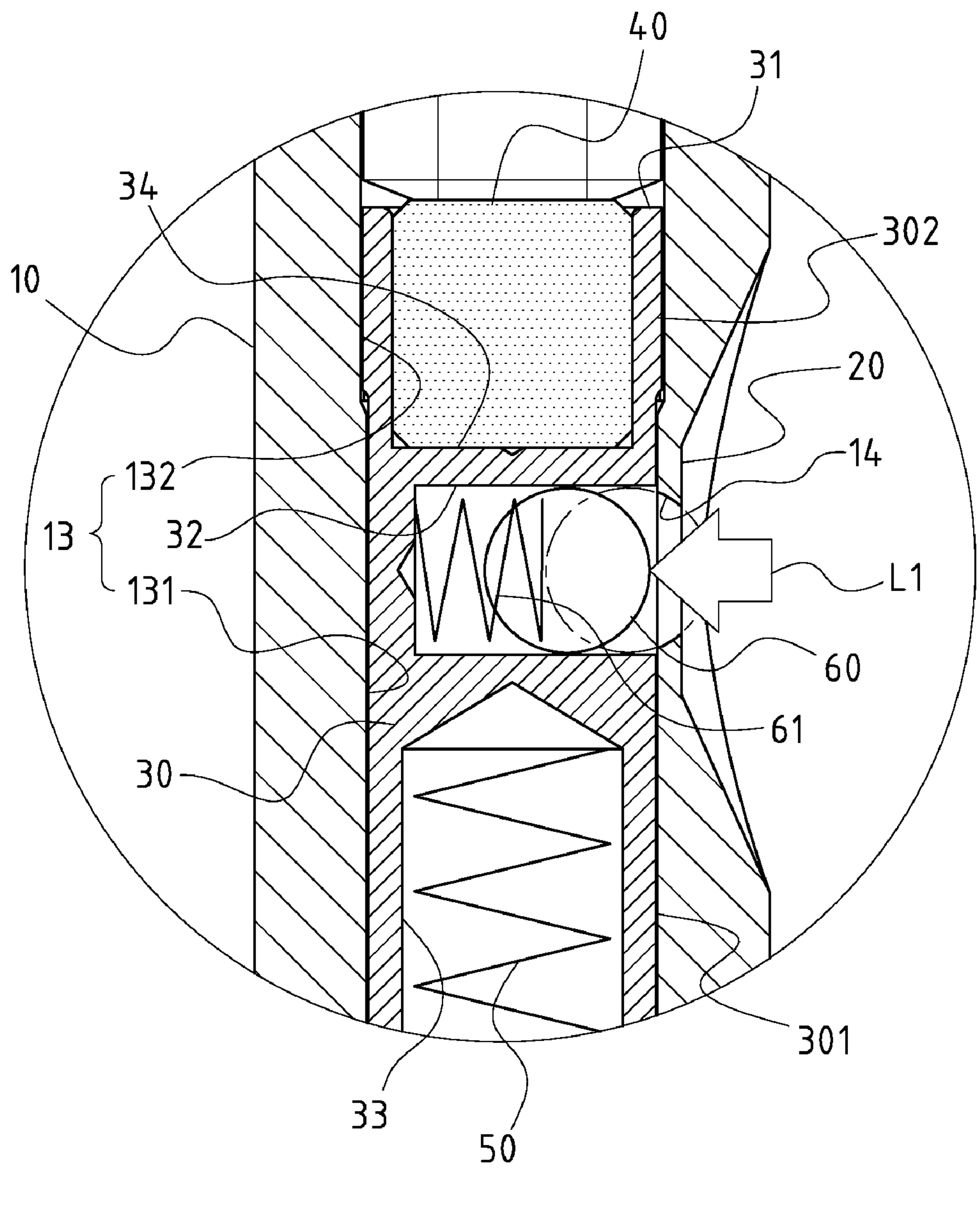
FIG. 4 shows a schematic view of the present invention wherein the control bead is pressed into a retraction state.
Figure 5:
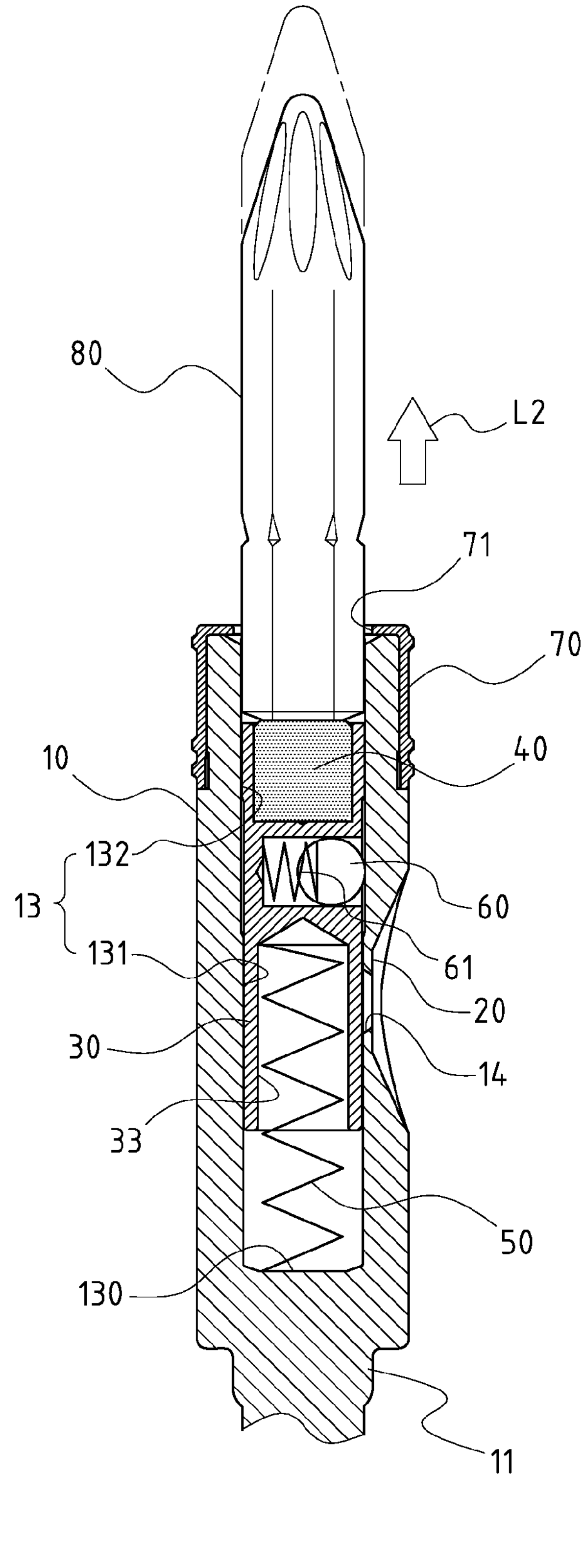
FIG. 5 shows a schematic view of the present invention wherein the internal slider is shifted outwards in a release state.

When the internal slider 30 is to be released from the tool head 80, referring to FIG. 4, the control bead 60 can be only pressed (indicated by arrow L1) so that it is recessed into the radial through-hole 14 and retracted into the radial groove 32 of the internal slider 30. In such a case, the internal slider 30 is pushed out with the elastic release function of the elastic bracing member 40 (shown in FIG. 5), so that the tool head 80 can be retreated (indicated by arrow L2) and taken out easily by the user.

Figure 6:
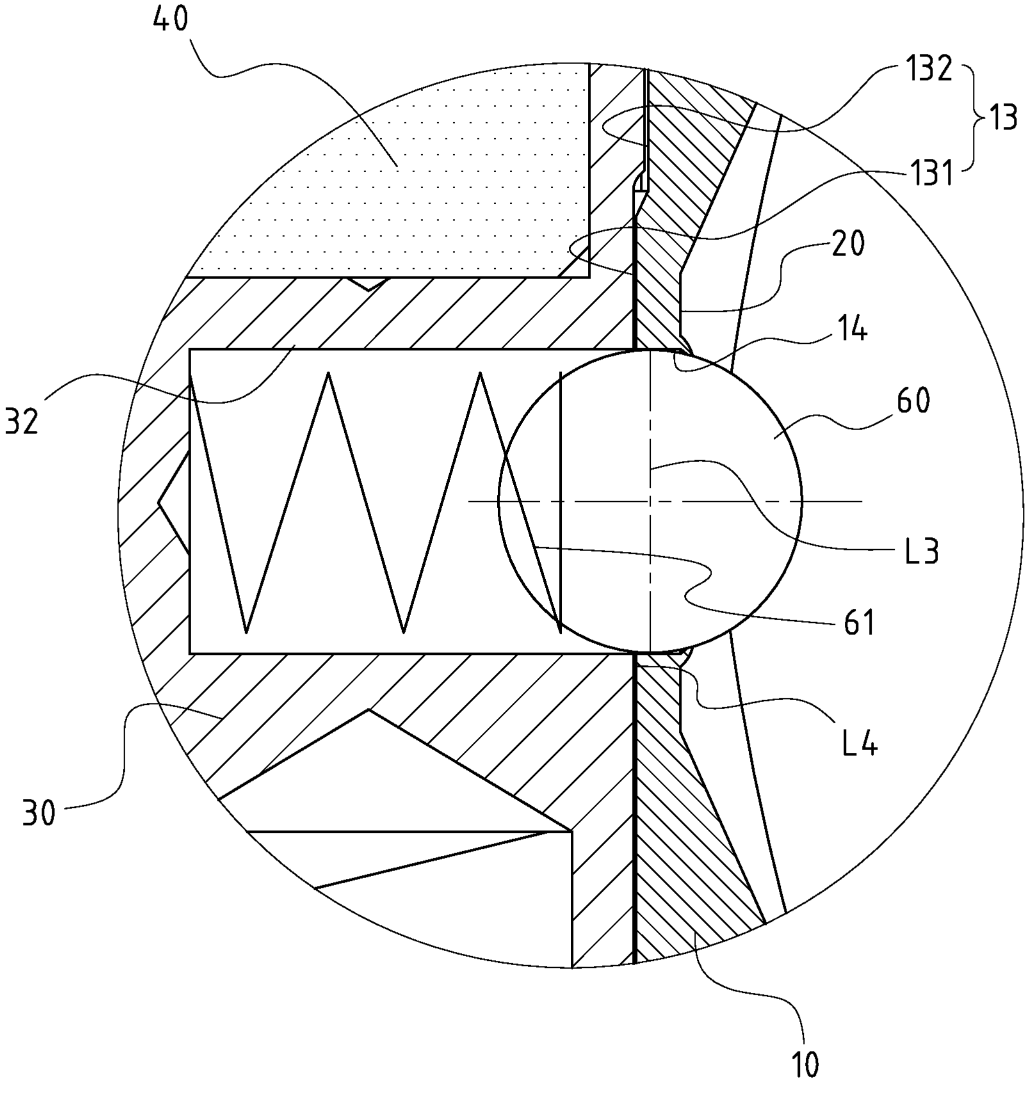
FIG. 6 shows a sectional view of the present invention showing detailed assembly structure of the control bead.

Referring to FIG. 6, when the control bead 60 is aligned with the radial through-hole 14 of the slot 13 in a positioning state, the centerline L3 may surpass the end surface (L4) of the radial groove 32. With this configuration, the embedded positioning state of the control bead 60 becomes more stable, eliminating efficiently the positioning tolerance. Meanwhile, the recessed positioning state of the internal slider 30 is made more accurate and stable without loosening and jittering.

Figure 7:
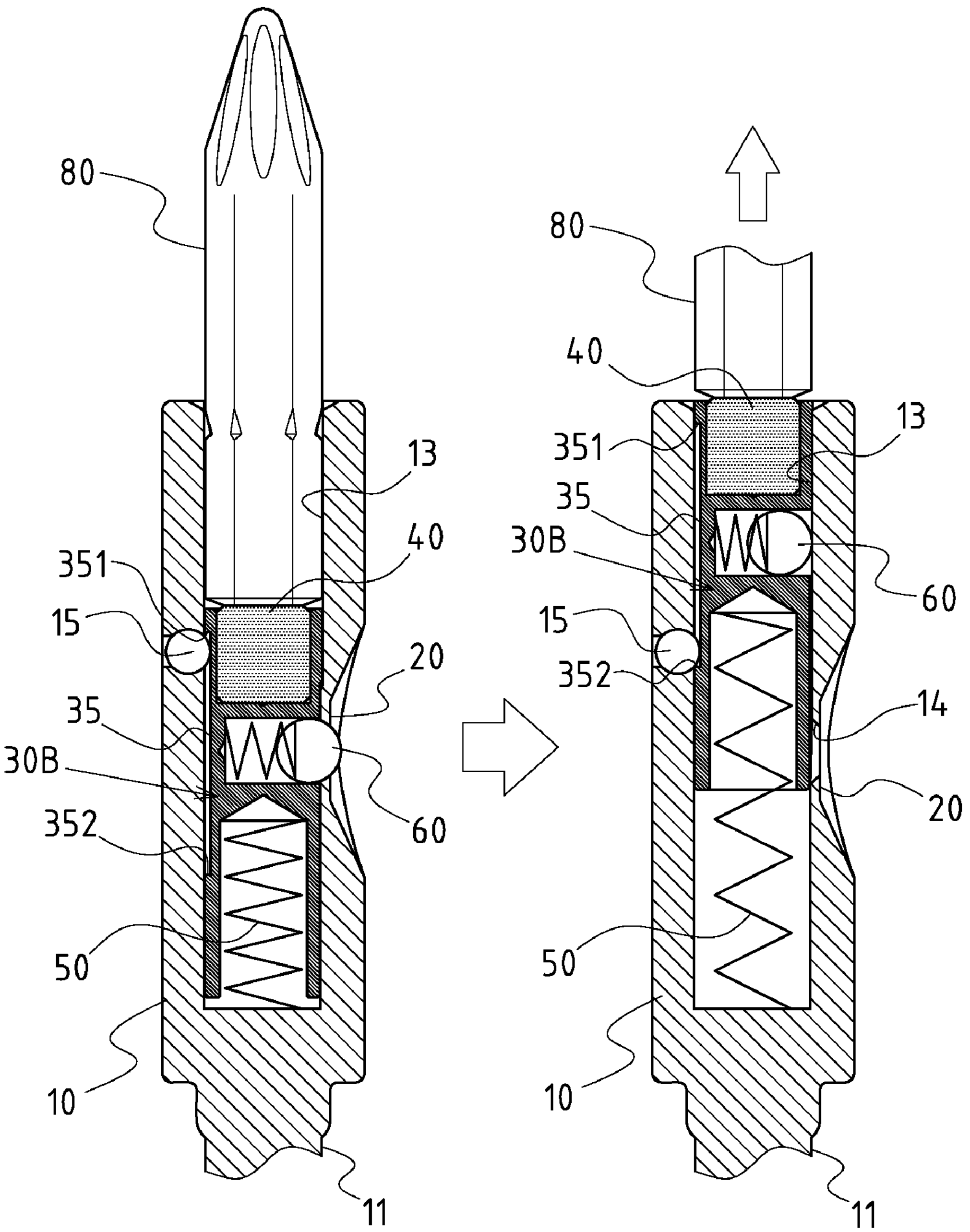
FIG. 7 shows a sectional view of another preferred embodiment of the internal slider of the present invention in a limitation state.

Referring also to FIG. 7, an axial long trough 35 is arranged at one side of the internal slider 30B. Said axial long trough 35 is provided with a first end 351 and a second end 352. A stopper 15 (e.g.: a steel ball) is set laterally onto the slot 13 of the hollow rod 10, and protruded into the axial long trough 35. So, the directional non-rotating state of the internal slider 30B can be realized through the mating of the axial long trough 35 and stopper 15, the axial sliding of the internal slider 30B can be limited as the stopper 15 is abutted onto the first end 351 or second end 352 of the axial long trough 35 (disclosed in left and right views of FIG. 7). In this preferred embodiment, the external wall of the internal slider 30B can be configured into a cylindrical pattern.

Figure 8:
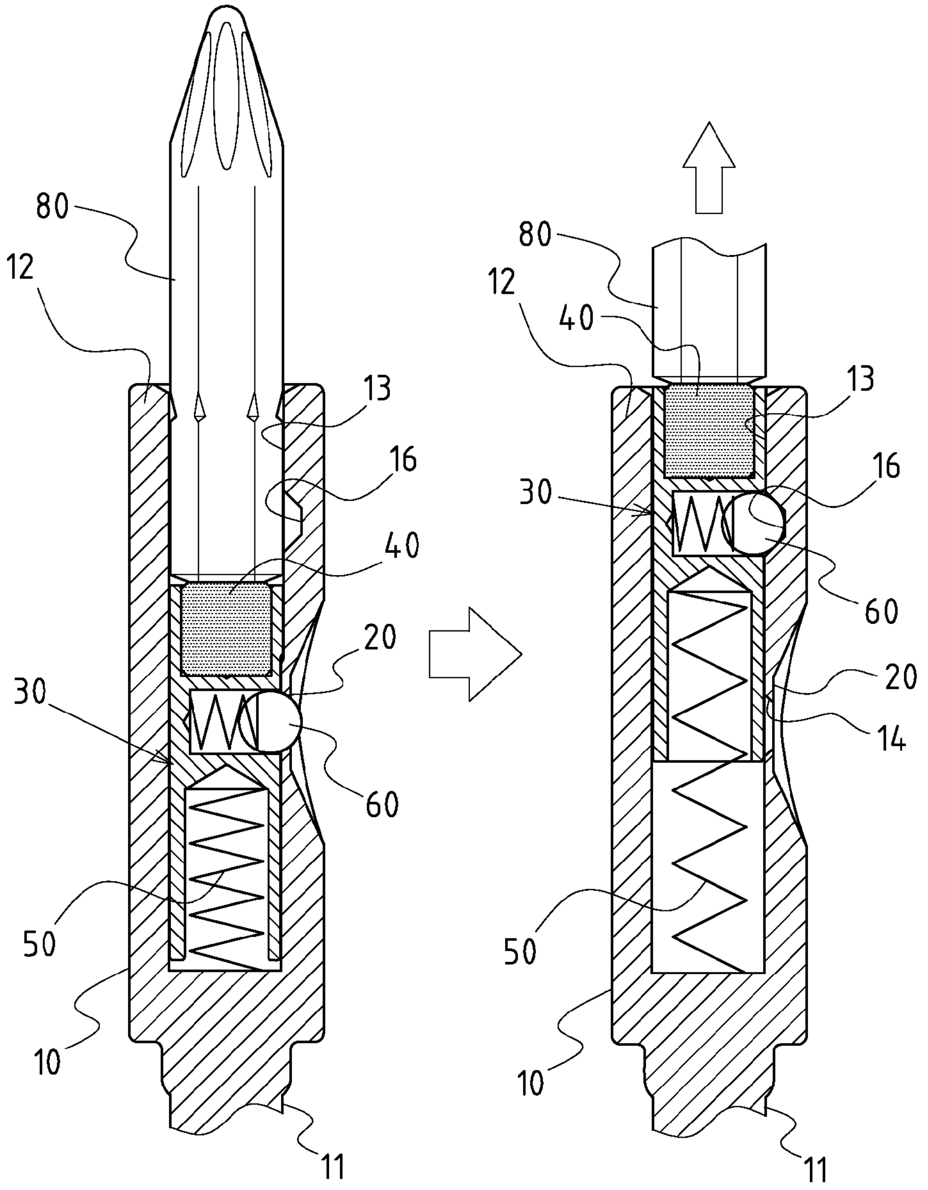
FIG. 8 shows a sectional view of another preferred embodiment of the internal slider of the present invention in a limitation state.

Referring also to FIG. 8, a limiting depression 16 is set laterally onto the slot 13 of the hollow rod 10 close to the tool head inserting end 12. When the internal slider 30 is slid towards the tool head inserting end 12 to the preset location (disclosed in right view of FIG. 8), the control bead 60 is snapped into the limiting depression 16, so the outward sliding state of the internal slider 30 can be positioned. With the configuration of this preferred embodiment, the limiting depression 16 can replace the aforementioned end cover 70.

I claim:

1. An improved connecting rod of tool head, said tool head connecting rod comprising:

a hollow rod having an assembly end and a tool head inserting end;

the tool head inserting end is recessed axially to form a slot, and a radial through-hole is placed at a preset depth into the slot;

an internal slider assembled into the slot of the hollow rod in an axial sliding and non-rotating state; the internal slider is provided with a tool head abutting end and a radial groove;

a magnetic member assembled onto the tool head abutting end of the internal slider;

an elastic bracing member assembled between the internal slider and the inner wall of the slot, said elastic bracing member used to support elastically the internal slider; and a control bead assembled into the radial groove of the internal slider; the control bead is elastic with assembly of an elastic member; moreover, one side of the control bead is aligned with the radial through-hole of the slot, so it can be protruded in a positioning state.

2. The improved structure defined in claim 1, wherein an end cover is assembled onto exterior of the tool head inserting end of the hollow rod; the end cover is provided with a reducing port; the diameter of the reducing port is smaller than external diameter of the internal slider, helping to prevent tripping of internal slider.

3. The improved structure defined in claim 1, wherein the slot of the hollow rod has a round internal slotted section and a hexagonal external slotted section; a cylindrical section and a hexagonal columnar section are arranged externally onto the internal slider, so that the sliding of the internal slider can be positioned without rotation through polygonal mating of the hexagonal columnar section and the hexagonal external slotted section.

4. The improved structure defined in claim 1, wherein an internal groove is set centrally onto the tool head abutting end of the internal slider, so that the magnetic member is embedded into the internal groove.

5. The improved structure defined in claim 1, wherein said control bead is a steel ball.

6. The improved structure defined in claim 1, wherein an axial long trough is arranged at one side of the internal slider; said axial long trough is provided with first and second ends; a stopper is set laterally onto the slot of the hollow rod, and protruded into the axial long trough; so the directional non-rotating state of the internal slider can be realized through the mating of the axial long trough and stopper, and the axial sliding of the internal slider can be limited as the stopper is abutted onto the first or second end of the axial long trough.

7. The improved structure defined in claim 1, wherein a limiting depression is set laterally onto the slot close to the tool head inserting end; when the internal slider is slid towards the tool head inserting end to the preset location, the control bead is snapped into the limiting depression, so the outward sliding state of the internal slider can be positioned.

8. The improved structure defined in claim 1, wherein the centerline surpasses the end surface of the radial groove when the control bead is aligned with the radial through-hole of the slot in a positioning state.

9. The improved structure defined in claim 1, wherein a lateral recess is set externally onto one side of the hollow rod, and the radial through-hole is set at the center of the lateral recess; so the control bead can be protruded into the space of the lateral recess.

* * * * *